(12) United States Patent  (10) Patent No.: US 9,367,347 B1
Zhu et al.  (45) Date of Patent: Jun. 14, 2016

(54) SYSTEMS AND METHODS FOR COMMAND EXECUTION ORDER CONTROL IN ELECTRONIC SYSTEMS

(71) Applicant: Marvell International Ltd., Hamilton (BM)

(72) Inventors: Jun Zhu, San Jose, CA (US); Tsung-Ju Yang, Los Gatos, CA (US); Ruoyang Lu, San Jose, CA (US); Joseph Jun Cao, Los Gatos, CA (US)

(73) Assignee: MARVELL INTERNATIONAL, LTD., Hamilton (BM)

( * ) Notice: Subject to any disclaimer, the term of this patent is extended or adjusted under 35 U.S.C. 154(b) by 111 days.

(21) Appl. No.: 14/266,926

(22) Filed: May 1, 2014

Related U.S. Application Data

(60) Provisional application No. 61/836,066, filed on Jun. 17, 2013.

(51) Int. Cl.
  *G06F 9/46* (2006.01)
(52) U.S. Cl.
  CPC ....................................... *G06F 9/466* (2013.01)
(58) Field of Classification Search
  None
  See application file for complete search history.

(56) References Cited

U.S. PATENT DOCUMENTS

| | | | |
|---|---|---|---|
| 5,999,534 A * | 12/1999 | Kim ................... | H04L 12/5602 370/395.42 |
| 6,219,751 B1 * | 4/2001 | Hodges ......................... | 711/114 |
| 6,789,134 B1 * | 9/2004 | Young ............................. | 710/5 |
| 8,284,207 B2 * | 10/2012 | Bakalash et al. .............. | 345/505 |
| 8,340,970 B2 * | 12/2012 | Grant et al. .................... | 704/270 |
| 2001/0028524 A1 * | 10/2001 | Hoskins .......................... | 360/55 |
| 2005/0135355 A1 * | 6/2005 | Muthukrishnan ... | H04L 12/5693 370/389 |
| 2008/0059672 A1 * | 3/2008 | Irish et al. ...................... | 710/116 |
| 2008/0189501 A1 * | 8/2008 | Irish et al. ...................... | 711/167 |
| 2010/0011137 A1 * | 1/2010 | McGowan ..................... | 710/105 |
| 2010/0077175 A1 * | 3/2010 | Wu et al. ........................ | 711/172 |
| 2014/0047448 A1 * | 2/2014 | Bishop .................... | G06F 9/542 718/103 |

* cited by examiner

Primary Examiner — Adam Lee

(57) ABSTRACT

Systems and methods are provided for command execution. A stream-array data structure including a plurality of stream entries is received. One or more head pointers of one or more command chains are obtained from the stream entries. One or more source commands corresponding to the one or more head pointers are obtained in the command chains. A target command is selected from the one or more source commands based at least in part on a priority of the target command. The target command is executed, and removed from the command chains. The stream-array data structure is updated.

20 Claims, 12 Drawing Sheets

SYSTEMS AND METHODS FOR COMMAND EXECUTION ORDER CONTROL IN ELECTRONIC SYSTEMS

CROSS-REFERENCE TO RELATED APPLICATIONS

This disclosure claims priority to and benefit from U.S. Provisional Patent Application No. 61/836,066, filed on Jun. 17, 2013, the entirety of which is incorporated herein by reference.

FIELD

The technology described in this patent document relates generally to electronic systems and more particularly to command execution in electronic systems.

BACKGROUND

Digital-logic system components are often implemented together on a single chip (i.e., system on a chip or SOC). On-chip buses connect different components which often compete for resources. One approach to improve the efficiency of a SOC system involves out-of-order execution of commands received by a shared resource. For example, a memory may be shared by two on-chip processors, where one processor is faster than the other. A long series of commands between the memory and the slow processor may delay a later-received command of the fast processor. With out-of-order command execution, the commands of the slow processor may be temporarily suspended so that the command of the fast processor may be executed. The increase in the total execution time for the series of commands of the slow processor may be negligible, while the command of the fast processor avoids a potentially significant delay.

A re-order buffer (ROB) may be implemented for out-of-order execution of commands. FIG. 1 depicts an example diagram for a re-order buffer. As shown in FIG. 1, a re-order buffer 12 is configured to reorder data packets in a data sequence 14 obtained through out-of-order execution of a command sequence 16, and output a reordered data sequence 18.

Specifically, the command sequence 16 includes multiple read commands, e.g., CY0, CY1, CU0, CY2, . . . , etc., where "C" stands for "command," "Y" and "U" represent two different streams, and the numerals "0," "1" and "2" represent command identifications (IDs). A stream includes a series of commands from a same source, or a series of commands directed to a same target address or consecutive target addresses. In addition, the data sequence 14 and the data sequence 18 each include multiple data packets, e.g., DY1, DU0, DY0, DY3, . . . , etc., where "D" stands for "data," and "Y" and "U" represent the two different streams.

Multiple commands for two streams (e.g., the streams "Y" and "U") are interleaved in the command sequence 16. For example, the commands "CY0" and "CY1" for the stream "Y" precede the command "CU0" for another stream "U" which is followed by another command "CY2" for the stream "Y." The data sequence 14 is obtained through out-of-order execution of the commands in the command sequence 16. The ROB 12 reorders the data packets in the data sequence 14 so that the data packets for a same stream are to be output in a specific order. For example, for the stream "Y," the data packet "DY1" precedes the data packet "DY0" in the data sequence 14, and after the reordering of the ROB 12, the data packet "DY1" follows the data packet "DY0" in the data sequence 16. Similarly, for the stream "U," the data packet "DU2" precedes the data packet "DU1" in the data sequence 14, and after the reordering of the ROB 12, the data packet "DU2" follows the data packet "DU1" in the data sequence 106. In addition, the ROB 12 reorders the data packets in the data sequence 14 so that the data packets for different streams can be output according to a priority parameter.

Out-of-order execution may cause certain hazards which need to be resolved in a SOC system. For example, a write command and a read command are consecutively sent to a same target address. If the write command and the read command are executed out of order, the updated data at the target address may not be read back as planned. In this case, the execution order of the write command and the read command has to be maintained so that updated data at the target address can be returned. In another example, two write commands are consecutively sent to a same target address, and usually have to be executed in order to ensure that the latest data is written last.

FIG. 2 depicts an example diagram for a hazard controller. As shown in FIG. 2, the hazard controller 22 is configured to keep the execution order of certain commands in a command sequence 24 during the out-of-order execution of commands. Specifically, the command sequence 24 includes a write command "W0" and a read command "R2" that are both directed to a same target address "0x100." Though the read command "R2" has a higher priority parameter (e.g., P=5) than the write command "W0" (e.g., P=1), the write command "W0" has to be executed before the read command "R2" so that the updated data at the target address "0x100" can be read back. In addition, the command sequence 24 includes two write commands "W1" and "W3" that are both directed to a same target address "0x80." Though the write command "W3" has a higher priority parameter (e.g., P=9) than the write command "W1" (e.g., P=3), the write command "W3" is executed after the write command "W1." As such, the hazard controller 22 maintains the execution order of these commands in a command sequence 26 that is generated by reordering the commands based at least in part on the priority parameter.

SUMMARY

In accordance with the teachings described herein, systems and methods are provided for command execution. A stream-array data structure including a plurality of stream entries is received. One or more head pointers of one or more command chains are obtained from the stream entries. One or more source commands corresponding to the one or more head pointers are obtained in the command chains. A target command is selected from the one or more source commands based at least in part on a priority of the target command. The target command is executed, and removed from the command chains. The stream-array data structure is updated.

In one embodiment, a method is provided for command execution. A stream-array data structure including a plurality of stream entries is stored. A new command associated with a first stream is received. A stream entry corresponding to the first stream is searched for in the stream-array data structure. In response to a stream entry corresponding to the first stream being located in the stream-array data structure, the new command is added to a command chain associated with the located stream entry. In response to no stream entry corresponding to the first stream being located in the stream-array data structure, an empty stream entry is assigned to the first stream and the new command is associated with the empty stream entry.

In another embodiment, an example system includes: a computer-readable storage medium configured to store a stream-array data structure including a plurality of stream entries; and one or more data processors. The data processors are configured to: receive a stream-array data structure including a plurality of stream entries, a stream entry being associated with a command chain; obtain one or more first commands from one or more command chains; select a target command from the one or more first commands based at least in part on a target priority of the target command; execute the target command; remove the target command from the command chains; and update the stream-array data structure.

DETAILED DESCRIPTION

In a SOC system, commands for a particular stream often need to be executed in a particular order to ensure proper system operations. Commands for different streams can be executed out of order (e.g., based at least in part on a priority parameter) to improve system performance. Storing all commands in a single queue usually makes out-of-order execution of commands very difficult. Different queues may be used to store commands for different streams. However, it is usually difficult to search for top commands (e.g., with highest priority parameters) to be executed among the different queues. In addition, a large number of queues may be needed to handle commands for all streams of a complicated SOC system, which results in inefficiency.

Figure 1:
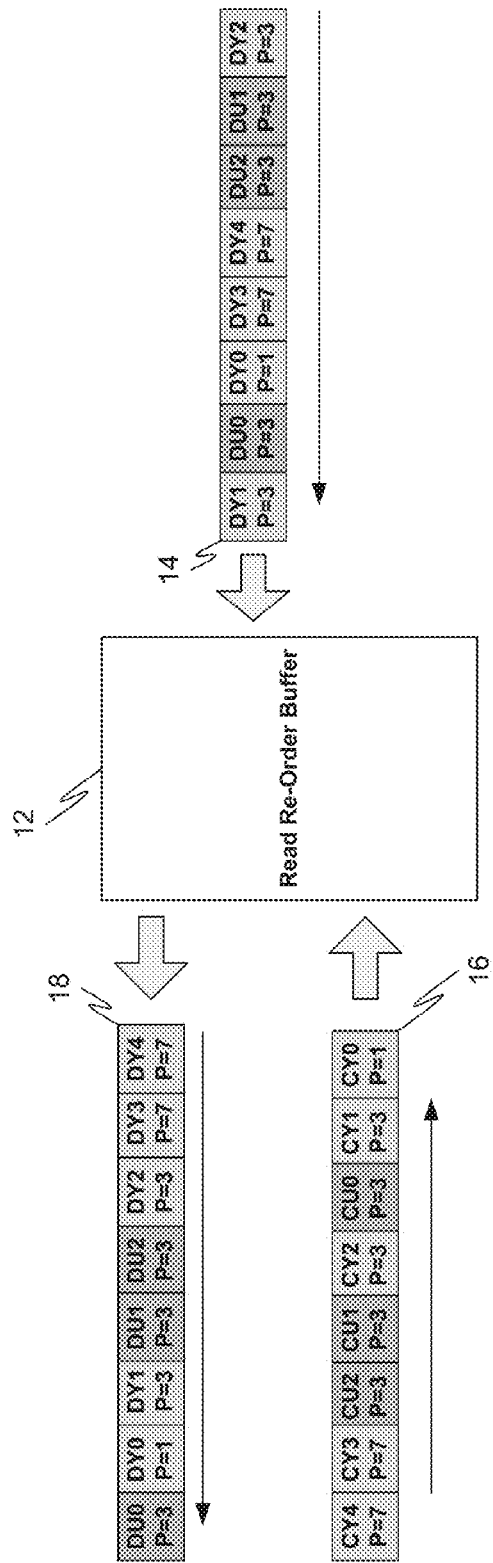
FIG. 1 depicts an example diagram for a re-order buffer.
Figure 2:
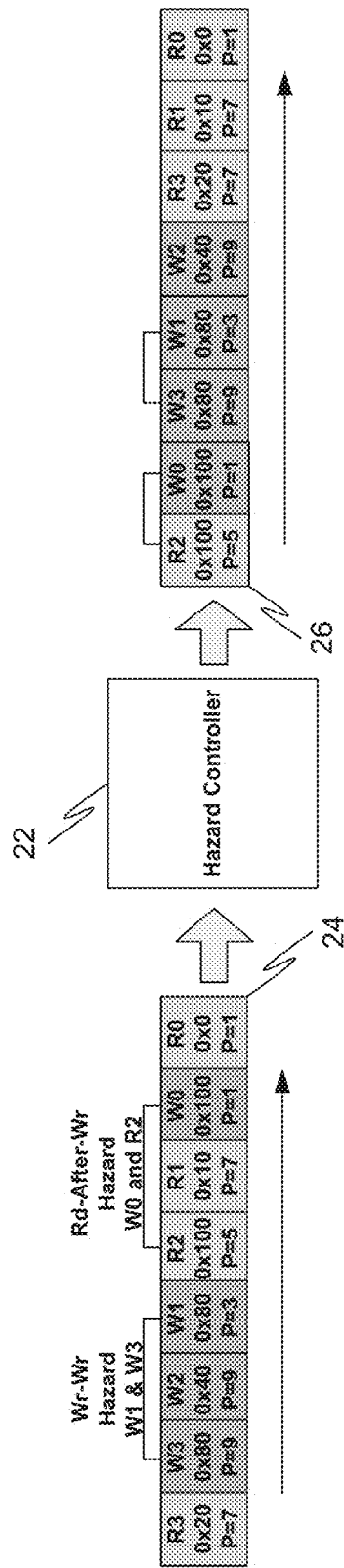
FIG. 2 depicts an example diagram for a hazard controller.
Figure 3:
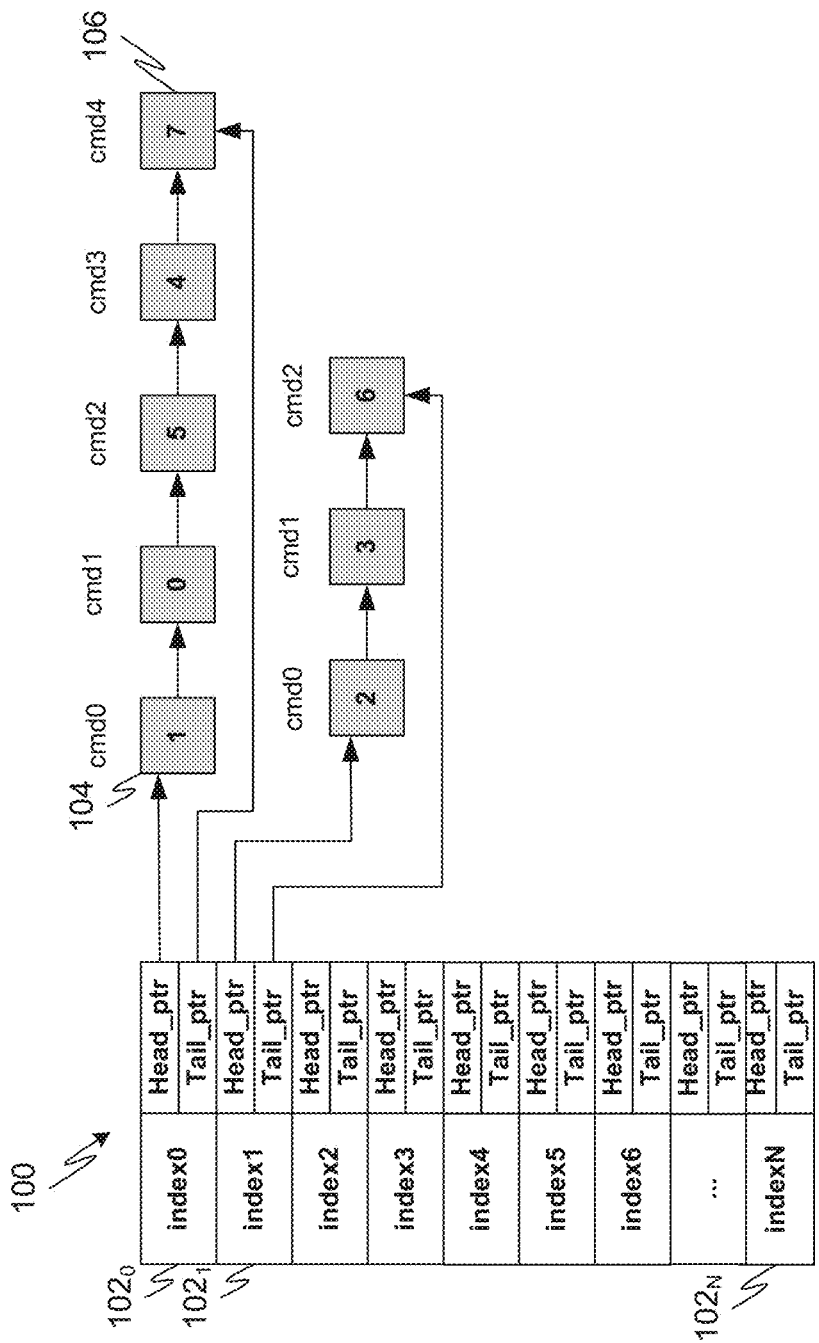
FIG. 3 depicts an example diagram for a stream-array data structure.

FIG. 3 depicts an example diagram for a stream-array data structure. As shown in FIG. 3, the stream-array data structure 100 (e.g., a link-list array) includes multiple stream entries $102_0, 102_1, \ldots, 102_N$ (N≥1) that correspond to different streams. Each stream entry includes a head pointer (e.g., "Head_ptr") and a tail pointer (e.g., "Tail_ptr") for a command chain, where the head pointer points to a head node (e.g., a head command) of the command chain and the tail pointer points to a tail node (e.g., a tail command) of the command chain. The stream-array data structure 100 can be implemented for executing commands for various streams.

Specifically, a first stream entry $102_0$ includes an index value (e.g., "index0") that identifies a first stream, and corresponds to a command chain that includes five commands. A head pointer (e.g., "Head_ptr") of the first stream entry $102_0$ points to the node 104 (e.g., "cmd0") in the command chain, and a tail pointer (e.g., "Tail_ptr") points to the node 106 (e.g., "cmd4") in the command chain. In addition, a second stream entry $102_1$ includes an index value (e.g., "index1") that identifies a second stream, and corresponds to a command chain that includes three commands.

In some embodiments, each command (e.g., "cmd0") includes a "V" field and a "P" field, where the "V" field indicates whether the command is valid and the "P" field indicates a priority parameter of the command. For example, the priority parameter of the command 104 is 1, and the priority of the command 106 is 7, as shown in FIG. 3. In addition, each node includes a next pointer that points to a next node in the command chain.

Figure 4:
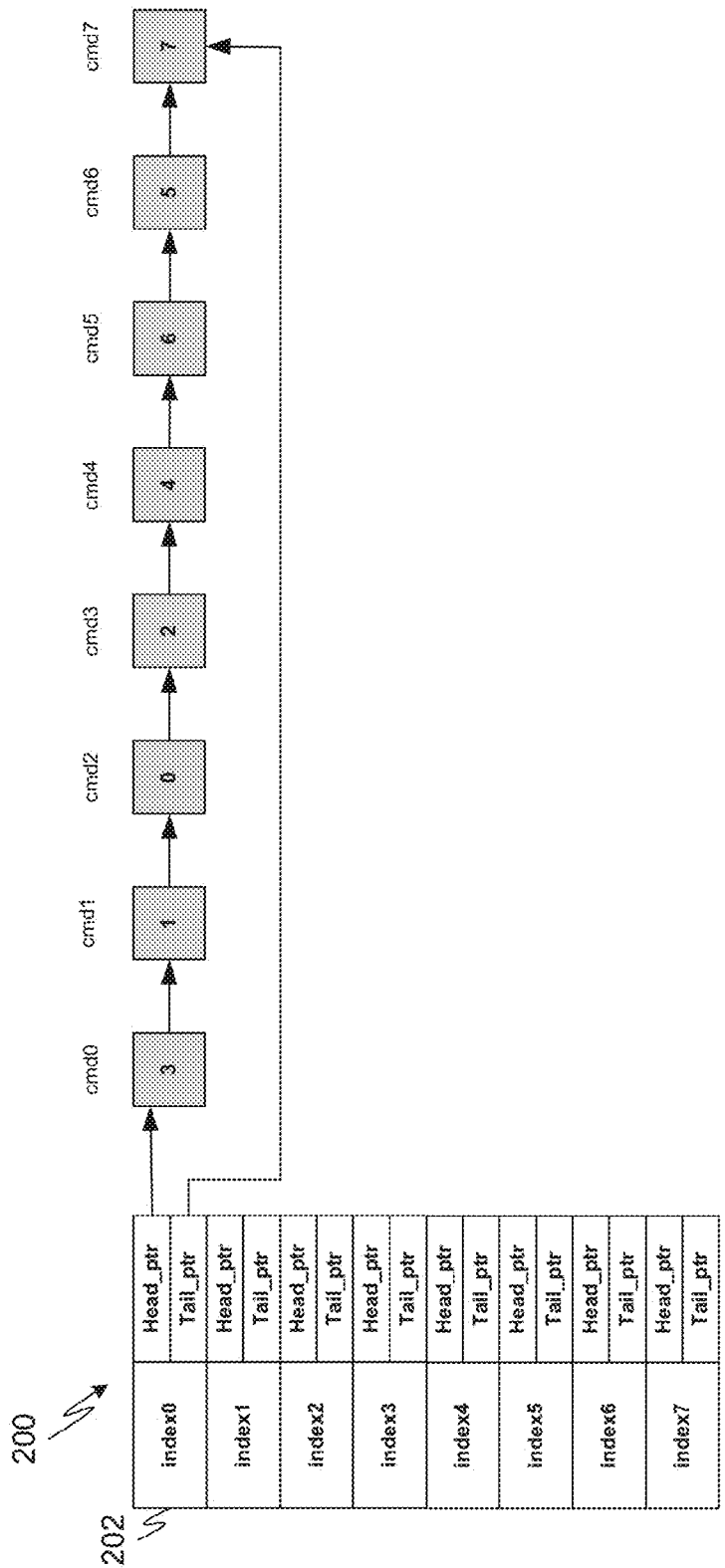
FIG. 4 and FIG. 5 depict example diagrams for two different stream-array data structures respectively.
Figure 5:
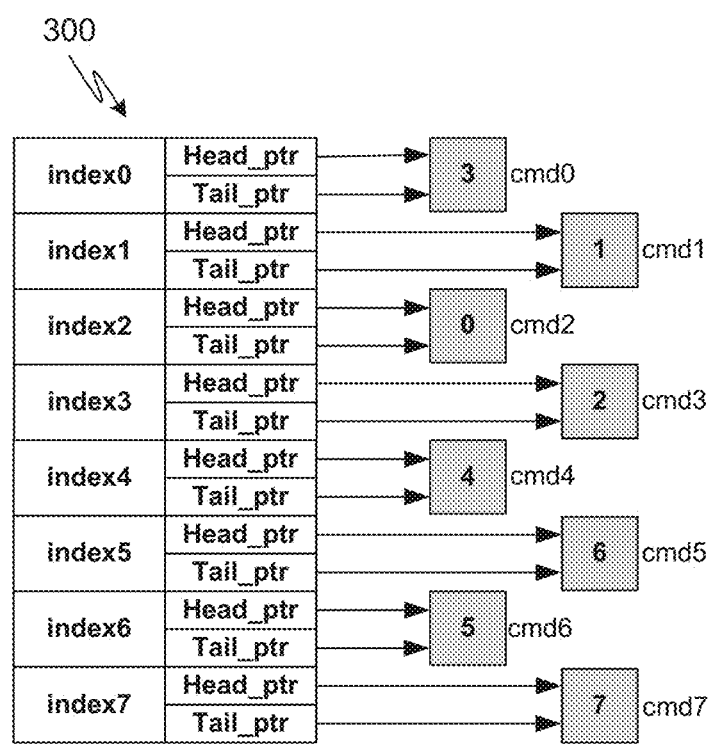

FIG. 4 and FIG. 5 depict example diagrams for two different stream-array data structures respectively. As shown in FIG. 4, the stream-array data structure 200 (e.g., a link-list array) includes eight stream entries that correspond to eight different streams. The first stream entry 202 includes a head pointer (e.g., "Head_ptr") and a tail pointer (e.g., "Tail_ptr") that correspond to a command chain of eight nodes. As shown in FIG. 5, the stream-array data structure 300 includes eight stream entries, where each stream entry includes a head pointer (e.g., "Head_ptr") and a tail pointer (e.g., "Tail_ptr") for a command chain of a single node.

Figure 6:
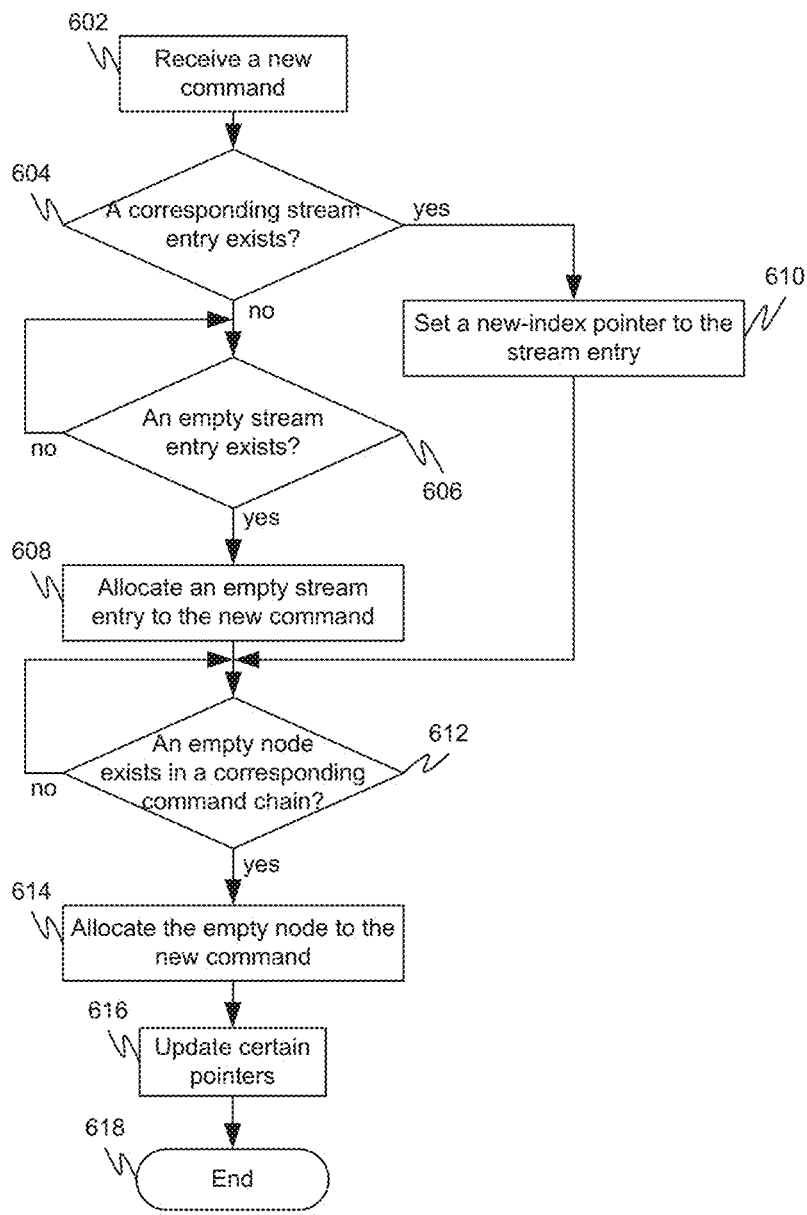
FIG. 6 depicts an example flow diagram for incorporating a new command to a stream-array data structure.

FIG. 6 depicts an example flow diagram for incorporating a new command to a stream-array data structure. As shown in FIG. 6, a new command is incorporated at the end of a command chain that corresponds to a stream entry in the stream-array data structure (e.g., a link-list array). Specifically, at 602, a new command for a stream is received and includes a stream identifier (e.g., an index value) of the stream. At 604, a stream-array data structure (e.g., the data structure 100) is searched to determine whether there is a stream entry that includes the stream identifier. If the stream-array data structure does not contain a stream entry that includes the stream identifier, at 606, it is determined whether the stream-array data structure includes an empty stream entry. If an empty stream entry is located, at 608, the empty stream entry is allocated to the new command. In addition, the stream identifier is assigned to the empty stream entry, and a new-index pointer is set to the empty stream entry.

On the other hand, if the stream entry that includes the stream identifier is located, at 610, the new-index pointer is set to the located stream entry. At 612, it is determined whether a command chain corresponding to the located stream entry includes an empty node. If an empty node is located, at 614, the empty node is allocated to the new command, and information of the new command is stored into the empty node. A new-command pointer is set to the allocated node. At 616, certain pointers of the command chain are updated to complete the incorporation process. For example, the new-command pointer replaces a tail pointer of the allocated stream entry. In addition, the new-command pointer also replaces a head pointer of the allocated stream entry if the allocated stream entry is an empty stream entry. The following example codes may be used for updating the pointers:

if (new_index_ptr.tail_ptr==NULL){/* this is new index entry */
   new_index_ptr.tail_ptr=new_cmd_ptr;
   new_index_ptr.head_ptr=new_cmd_ptr;
}
else {/* this is hit index entry */
   new_index_ptr.tail_ptr.next_ptr=New_cmd_ptr.next_ptr;
   new_index_ptr.tail_ptr=new_cmd_ptr;
}

At 618, the process for incorporating the new command ends.

Figure 7:
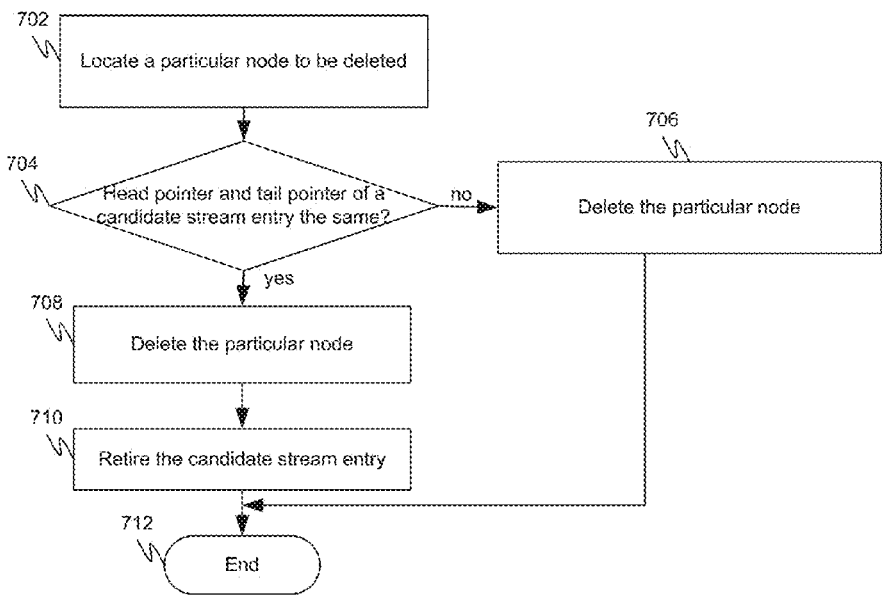
FIG. 7 depicts an example flow diagram for deleting a command from a stream-array data structure.

FIG. 7 depicts an example flow diagram for deleting a command from a stream-array data structure. As shown in FIG. 7, a particular node (e.g., a particular command) is located and deleted from a command chain that corresponds to a stream entry in the stream-array data structure (e.g., a link-list array).

Specifically, at 702, all command chains associated with the stream-array data structure are searched to locate the particular node. For example, all head nodes (e.g., head commands) of the command chains are compared, and the particular node to be deleted corresponds to a head node with a highest priority parameter. The located particular node corresponds to a candidate stream entry with a stream identifier. At 704, it is determined whether a head pointer and a tail pointer of the candidate stream entry are the same.

If the head pointer and the tail pointer of the candidate stream entry are different, it indicates that the command chain where the particular node is located includes other nodes. At 706, the particular node is removed from the command chain. For example, a "V" field of the particular node is set to 0, and the head pointer of the candidate stream entry is replaced with a next pointer that points to a next node in the command chain. On the other hand, if the head pointer and the tail pointer of the candidate stream entry are the same, it indicates that the command chain where the particular node is located includes only the particular node. At 708, the particular node is removed. For example, a "V" field of the particular node is set to 0, and the head pointer and the tail pointer of the candidate stream entry are set to a specific value (e.g., NULL). At 710, the candidate stream entry is retired (e.g., set to empty). For example, a "V" field of the candidate stream entry is changed to 0. At 712, the process for deleting the particular node ends.

Figure 8:
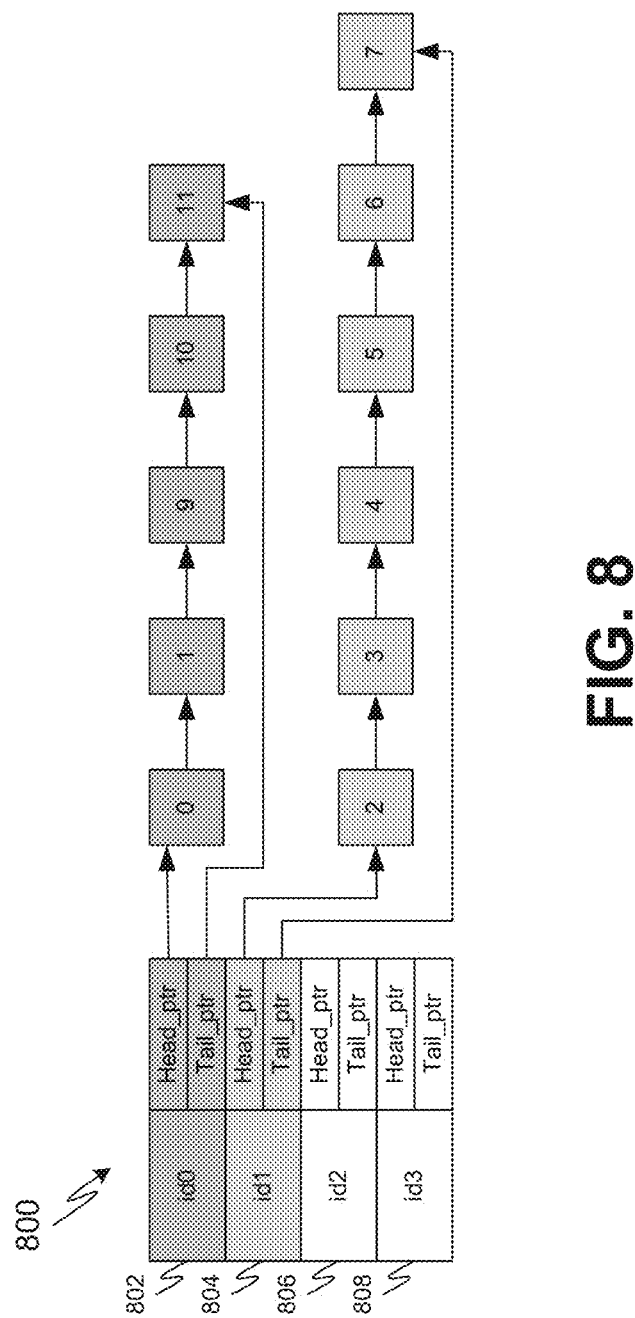
FIG. 8 and FIG. 9 depict example diagrams showing a stream-array data structure implemented for a re-order buffer.
Figure 9:
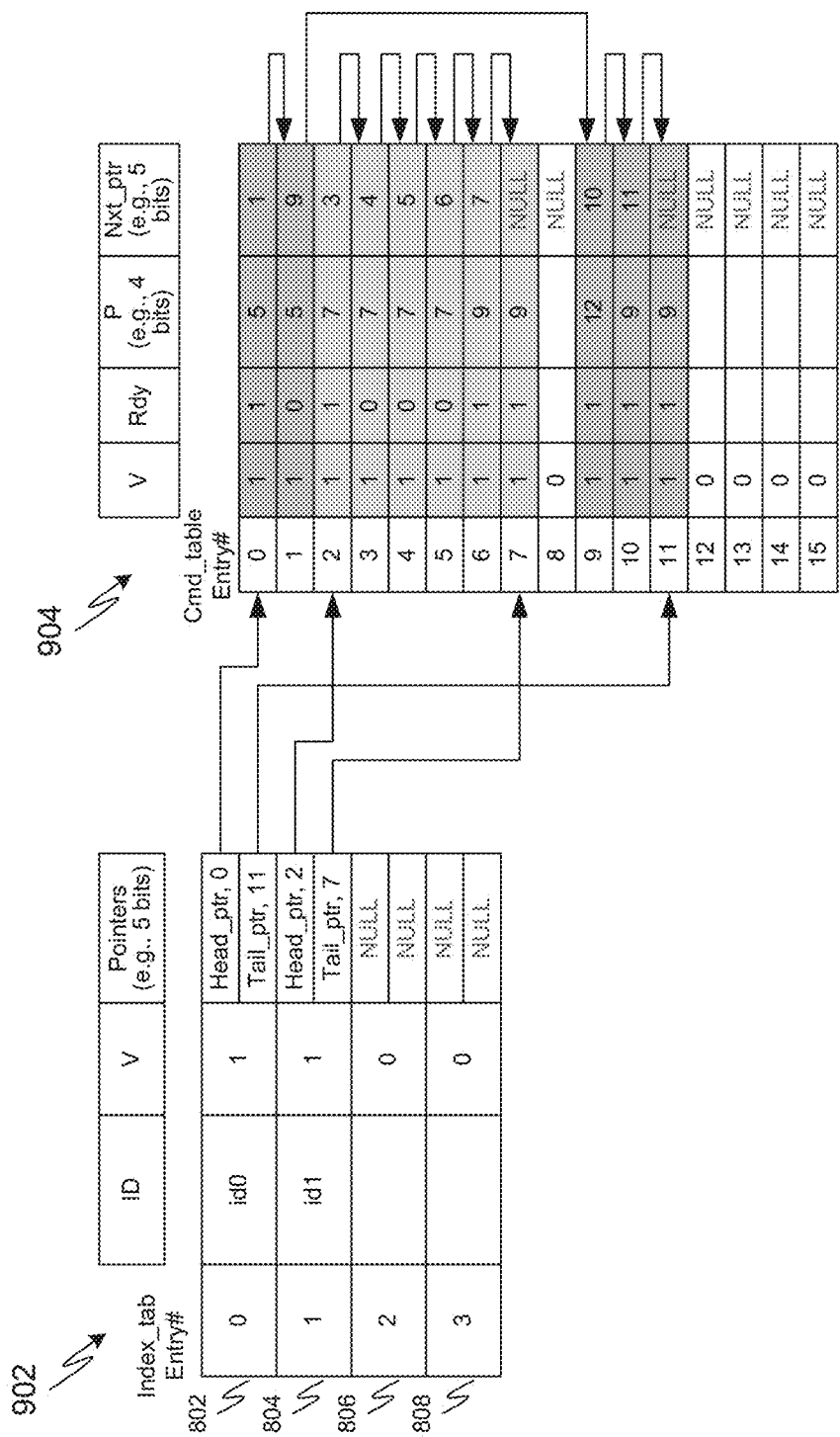

FIG. 8 and FIG. 9 depict example diagrams showing a stream-array data structure implemented for a re-order buffer. As shown in FIG. 8, the stream-array data structure 800 (e.g., a link-list array) includes four stream entries 802, 804, 806 and 808. The stream entries 802 and 804 each contain a head pointer (e.g., "Head_ptr") and a tail pointer (e.g., "Tail_ptr") for a command chain. Particularly, the stream entry 802 corresponds to a command chain including five nodes (e.g., five commands), and the stream entry 804 corresponds to another command chain including six nodes (e.g., six commands).

As shown in FIG. 9, the stream entries 802, 804, 806 and 808 are stored in an index table 902, and the commands in the command chains associated with the stream entries 802 and 804 are stored in a command table 904. Specifically, the stream entries 802, 804, 806 and 808 correspond to the index table entries "0," "1," "2," and "3" respectively. Each index table entry includes an "ID" field that identifies a stream, a "V" field that indicates whether the corresponding stream entry is valid (e.g., allocated and ready to use), and a "pointers" field that includes both a head pointer (e.g., "Head_ptr") and a tail pointer (e.g., "Tail_ptr"). For example, the "V" field of the index table entry "0" is 1, which indicates that the stream entry 802 is valid (e.g., allocated and ready to use). On the other hand, the "V" field of the index table entry "2" is 0, which indicates that the stream entry 806 is invalid (e.g., empty or unused).

As shown in FIG. 9, each command table entry includes a "V" field that indicates whether a corresponding command is valid (e.g., e.g., allocated and ready to use), a "Rdy" field that indicates whether the corresponding command is ready to execute, a "P" field that indicates a priority parameter, and a "Nxt_ptr" field that includes a next pointer pointing to a next command table entry. The head pointer of the index table entry "0" points to the command table entry "0," and the tail pointer of the index table entry "0" points to the command table entry "11." The command table entries "0," "1," "9," "10," and "11" are cascaded to form a command chain through the respective next pointers.

Moreover, the head pointer of the index table entry "1" points to the command table entry "2," and the tail pointer of the index table entry "1" points to the command table entry "7." The command table entries "2," "3," "4," "5," "6," and "7" are cascaded to form a command chain through the respective next pointers. For example, the pointer value "NULL" can be defined as 5'h1F. As shown in FIG. 9, the index table 902 and the command table 904 can support up to four streams and up to sixteen outstanding commands. Larger index tables and larger command tables may be used to support more streams and more outstanding commands.

Figure 10:
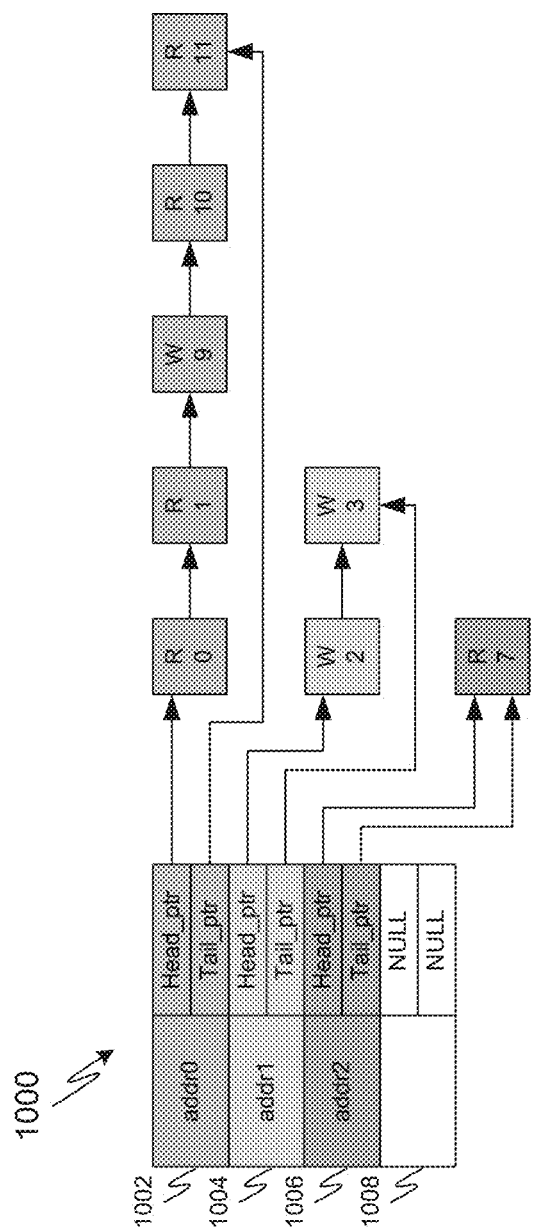
FIG. 10 and FIG. 11 depict example diagrams showing another stream-array data structure implemented for a hazard controller.
Figure 11:
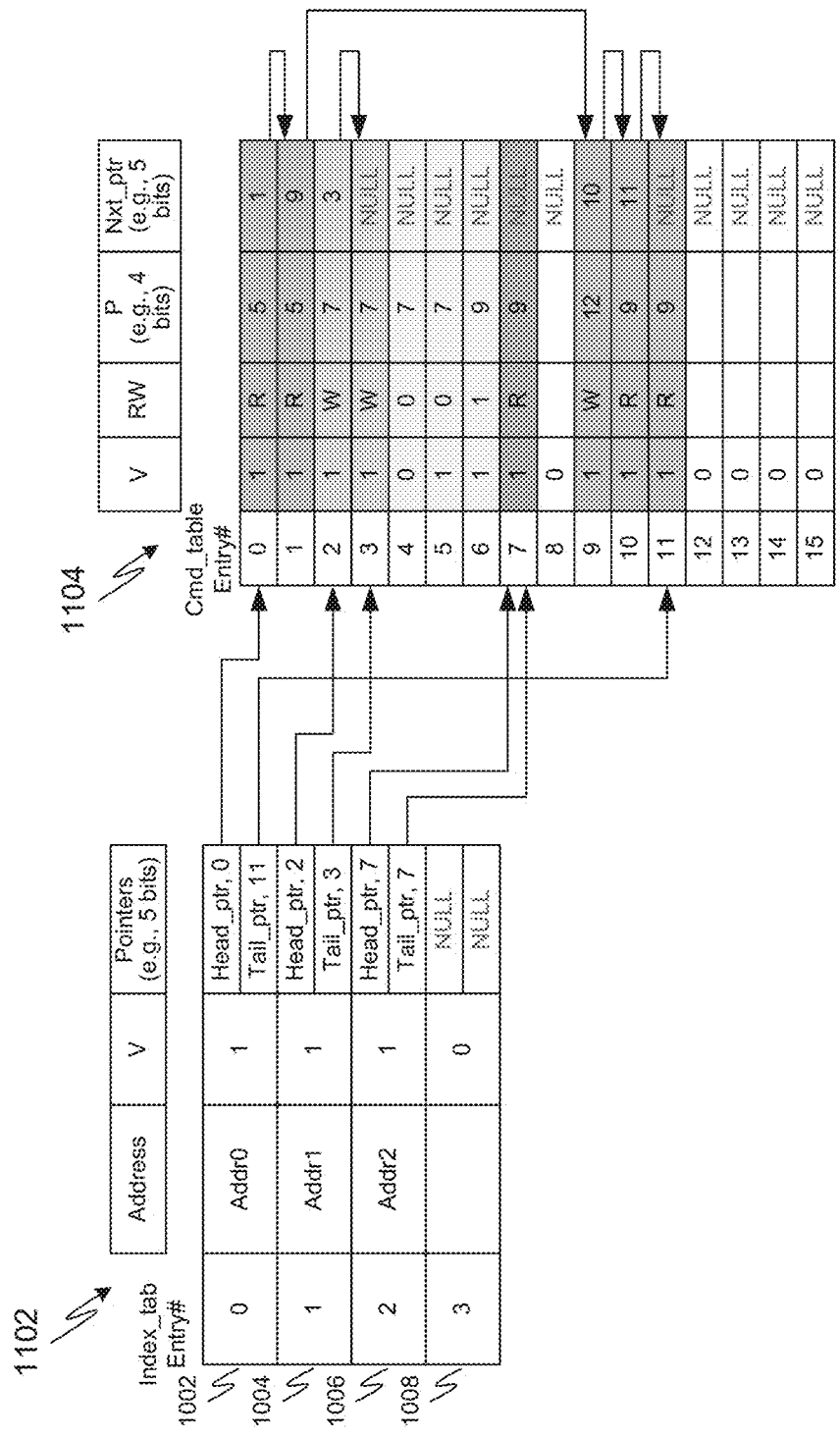

FIG. 10 and FIG. 11 depict example diagrams showing another stream-array data structure implemented for a hazard controller. As shown in FIG. 10, the stream-array data structure 1000 (e.g., a link-list array) includes four stream entries 1002, 1004, 1006 and 1008. The stream entries 1002, 1004 and 1006 each contain a head pointer (e.g., "Head_ptr") and a tail pointer (e.g., "Tail_ptr") for a command chain directed to a particular target address.

Particularly, the stream entry 1002 corresponds to a command chain including five nodes (e.g., five commands) directed to a target address "addr0," where the five commands include four read commands and a write command. The stream entry 1004 corresponds to another command chain including two nodes (e.g., two write commands) directed to a target address "addr1." In addition, the stream entry 1006 corresponds to yet another command chain including one node (e.g., one read command) directed to another target address "addr2."

As shown in FIG. 11, the stream entries 1002, 1004, 1006 and 1008 are stored in an index table 1102, and the commands in the command chains associated with the stream entries 1002, 1004, and 1006 are stored in a command table 1104. Specifically, the stream entries 1002, 1004, 1006 and 1008 correspond to the index table entries "0," "1," "2," and "3" respectively. Each index table entry includes an "Address" field that identifies a target address, a "V" field that indicates whether the corresponding stream entry is valid (e.g., allocated and ready to use), and a "pointers" field that includes both a head pointer (e.g., "Head_ptr") and a tail pointer (e.g., "Tail_ptr"). For example, the "V" field of the index table entry "0" is 1, which indicates that the stream entry 1002 is valid (e.g., allocated and ready to use). On the other hand, the "V" field of the index table entry "3" is 0, which indicates that the stream entry 1008 is invalid (e.g., empty or unused).

As shown in FIG. 11, each command table entry includes a "V" field that indicates whether a corresponding command is valid (e.g., e.g., allocated and ready to use), a "RW" field that indicates a type of the command (e.g., a read command or a write command), a "P" field that indicates a priority parameter, and a "Nxt_ptr" field that includes a next pointer pointing to a next command table entry. The head pointer of the index table entry "0" points to the command table entry "0," and the tail pointer of the index table entry "0" points to the command table entry "11." The command table entries "0," "1," "9," "10," and "11" are cascaded to form a command chain through the respective next pointers.

Moreover, the head pointer of the index table entry "1" points to the command table entry "2," and the tail pointer of the index table entry "1" points to the command table entry "3," where the next pointer of the command table entry "2" points to the command table entry "3." In addition, the head pointer and the tail pointer of the index table entry "2" both point to the command table entry "7," which indicates that the command chain for the target address "addr2" includes only one command.

Figure 12:
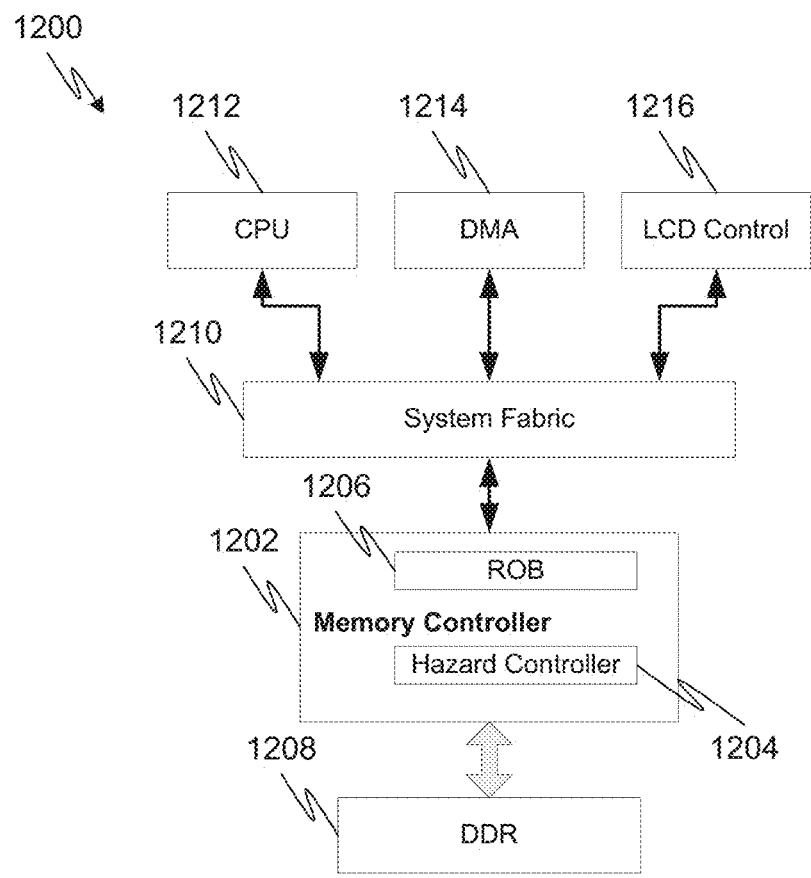
FIG. 12 depicts an example diagram showing a SOC system for executing commands.

FIG. 12 depicts an example diagram showing a SOC system for executing commands. As shown in FIG. 12, one or more stream-array data structures (e.g., the data structure 100 as shown in FIG. 3) can be implemented in a ROB 1206 and/or a hazard controller 1204 of a memory controller 1202 for out-of-order execution of commands.

Specifically, the SOC system 1200 includes a central processing unit (CPU) 1212, a direct-memory-access (DMA) component 1214, a liquid-crystal-display (LCD) controller 1216, a computer-readable memory 1208 (e.g., a double-data-rate memory), and a system fabric 1210. For example, the system fabric 1210 (e.g., an on-chip bus, a hub, etc.) includes one or more hardware elements for moving data between the memory 1208 and other system components, such as the CPU 1212, the DMA component 1214, and the LCD controller 1216. The memory controller 1202 that implements the stream-array data structures is configured to manage multiple streams for different system components and multiple outstanding commands to ensure that related commands are executed in a particular order and unrelated commands can be executed out of order to improve system performance.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for executing commands, the method comprising:
   receiving a stream-array data structure including a plurality of stream entries, each stream entry comprising a distinct command chain;
   identifying a command from each command chain of the plurality of stream entries, wherein each identified command has a priority;
   selecting, using the priority of each of the plurality of identified commands, a first command for execution from the plurality of identified commands;
   subsequent to executing the first command,
   (i) removing the first command from the command chain from which the first command was selected, and
   (ii) if there are one or more commands remaining in the command chain from which the first command was selected then identifying another command from the one or more remaining commands;
   selecting, using the priority of (i) the another command and (ii) each of the plurality of commands that were previously identified but not yet selected for execution, a second command for execution;
   subsequent to executing the second command, removing the second command from the command chain from which the second command was selected; and
   updating the stream-array data structure, wherein the updating includes setting any stream entries having no command chains to empty.

2. The method of claim 1, wherein:
   a first stream entry in the stream-array data structure includes a stream identifier, a head pointer of a first command chain and a tail pointer of the first command chain;
   the first command chain includes one or more cascaded commands;
   the head pointer points to a head command in the first command chain; and
   the tail pointer points to a tail command in the first command chain.

3. The method of claim 2, wherein:
   the second command is the head command of the first command chain; and
   the updating the stream-array data structure includes: replacing the head pointer with a next pointer that points to a different command that follows the second command in the first command chain.

4. The method of claim 1, wherein:
   the stream-array data structure includes a first stream entry and a second stream entry;
   the identifying a first command from each command chain includes:
      obtaining a first head pointer from the first stream entry, the first head pointer pointing to a first command chain;
      obtaining a second head pointer from the second stream entry, the second head pointer pointing to a second command chain;
      obtaining a first head command from the first command chain using at least the first head pointer; and
      obtaining a second head command from the second command chain using at least the second head pointer.

5. The method of claim 4, wherein:
   the first head command has a first priority;
   the second head command has a second priority;
   the selecting a first command for execution includes: in response to the first priority being higher than the second priority, selecting the first head command as the target command.

6. The method of claim 4, wherein:
   the stream-array data structure further includes a third stream entry;
   the identifying a first command from each command chain includes:
      obtaining a third head pointer from the third stream entry, the third head pointer pointing to a third command chain; and
      obtaining a third head command from the third command chain using at least the third head pointer.

7. The method of claim 6, wherein:
   the first head command has a first priority;
   the second head command has a second priority;
   the third head command has a third priority; and
   the selecting a first command for execution includes: in response to the first priority being higher than the second priority and the third priority, selecting the first head command as the first command.

8. A method comprising:
   storing a stream-array data structure including a plurality of command stream entries, each command stream entry comprising a distinct command chain;
   receiving from a first command stream a new command not stored in the stream-array data structure;

searching for a command stream entry matching the first command stream in the stream-array data structure;

in response to locating a command stream entry matching the first stream in the stream-array data structure, adding the new command to the command chain of the located command stream entry;

in response to not locating a command stream entry matching the first command stream in the stream-array data structure, determining that an empty stream entry exists in the stream-array data structure, assigning the empty command stream entry to the first command stream, determining that the empty command stream entry contains an empty command, and allocating the empty command to the new command; and updating the stream-array data structure.

9. The method of claim 8, wherein the command chain corresponding to the located command stream entry includes one or more cascaded original commands.

10. The method of claim 9, wherein:
the located command stream entry includes a tail pointer pointing to a last command of the command chain; and
the adding the new command to the command chain includes: replacing the tail pointer of the command chain in the located command stream entry with a new pointer pointing to the new command.

11. The method of claim 8, wherein:
the new command includes a command stream identifier of the first command stream; and
the searching for a command stream entry corresponding to the first command stream in the stream-array data structure includes: searching for a command stream entry that includes the command stream identifier.

12. The method of claim 8, wherein:
the new command includes a command stream identifier of the first command stream; and
the assigning an empty command stream entry to the first command stream includes: adding the command stream identifier to the empty command stream entry.

13. The method of claim 8, wherein:
the empty command stream entry assigned to the first command stream includes a head pointer and a tail pointer; and
the associating the new command with the empty command stream entry includes: replacing the head pointer and the tail pointer with a new pointer pointing to the new command.

14. A system comprising:
a computer-readable storage medium configured to store a stream-array data structure including a plurality of stream entries; and
one or more data processors configured to:
receive the stream-array data structure including the plurality of stream entries, each stream entry comprising a distinct command chain;
identify a command from each command chain of the plurality of stream entries, wherein each identified command has a priority;
select, using the priority of each of the plurality of identified commands, a first command for execution from the plurality of identified commands;
subsequent to executing the first command,
(i) remove the first command from the command chain from which the first command was selected, and
(ii) if there are one or more commands remaining in the command chain from which the first command was selected then identify another command from the one or more remaining commands;
select, using the priority of (i) the another command and (ii) each of the plurality of commands that were previously identified but not yet selected for execution, a second command for execution;
subsequent to executing the second command, remove the second command from the command chain from which the second command was selected; and
update the stream-array data structure, wherein the updating includes setting any stream entries having no command chains to empty.

15. The system of claim 14, wherein:
a first stream entry in the stream-array data structure includes a stream identifier, a head pointer of a first command chain and a tail pointer of the first command chain;
the first command chain includes one or more cascaded commands;
the head pointer points to a head command in the first command chain; and
the tail pointer points to a tail command in the first command chain.

16. The system of claim 15, wherein:
the second command is the head command of the first command chain; and
the data processors are further configured to: replace the head pointer with a next pointer that points to a different command that follows the second command in the first command chain.

17. The system of claim 14, wherein:
the stream-array data structure includes a first stream entry and a second stream entry;
the data processors are further configured to:
obtain a first head pointer from the first stream entry, the first head pointer pointing to a first command chain;
obtain a second head pointer from the second stream entry, the second head pointer pointing to a second command chain;
obtain a first head command from the first command chain using at least the first head pointer; and
obtain a second head command from the second command chain using at least the second head pointer.

18. The system of claim 17, wherein:
the first head command has a first priority;
the second head command has a second priority; and
the data processors are further configured to, in response to the first priority being higher than the second priority, select the first head command as the first command.

19. The system of claim 17, wherein:
the stream-array data structure further includes a third stream entry;
the data processors are further configured to:
obtain a third head pointer from the third stream entry, the third head pointer pointing to a third command chain; and
obtain a third head command from the third command chain using at least the third head pointer.

20. The system of claim 19, wherein:
the first head command has a first priority;
the second head command has a second priority;
the third head command has a third priority; and the data processors are further configured to, in response to the first priority being higher than the second priority and the third priority, select the first head command as the first command.

* * * * *